Dec. 21, 1954   H. J. BUTLER   2,697,499
WIRE MESH BRAKE DISK
Filed Oct. 29, 1949
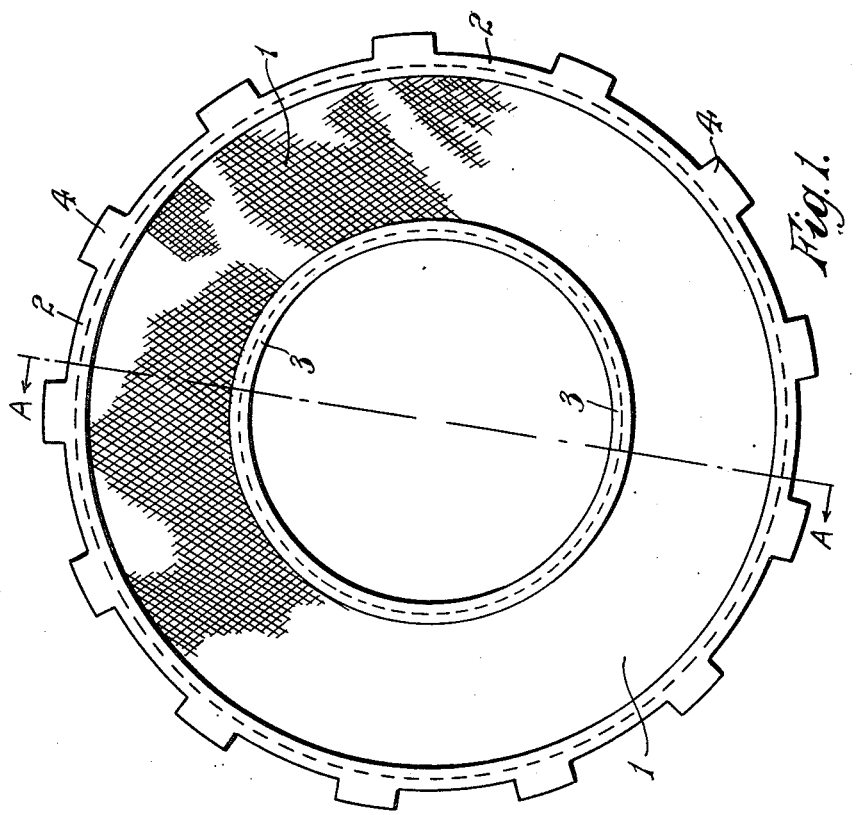

United States Patent Office 2,697,499
Patented Dec. 21, 1954

2,697,499

WIRE MESH BRAKE DISK

Henry James Butler, Sutton Coldfield, England, assignor to Dunlop Rubber Company Limited, London, England, a British company Application October 29, 1949, Serial No. 124,353

Claims priority, application Great Britain November 6, 1948

4 Claims. (Cl. 188—218)

This invention relates to disc brakes, and more particularly to brake discs.

In order that brake discs may absorb the large amounts of heat generated by friction between said discs and the friction pads of a disc brake when said brake is applied without reaching an excessive temperature, the discs hitherto have generally been constructed of substantial weight and thickenss, e. g. ¾ inch to 1 inch. The heat absorbed, however, is difficult to dissipate quickly, and if allowed to build up causes distortion of the disc, thereby lowering the efficiency of the brakes. Moreover, the excessive weight of such discs is objectionable, particularly in aircraft.

It is the object of this invention to provide an improved type of brake disc, which is particularly applicable for use in aircraft disc brakes.

According to the invention a brake disc comprises a thin annular braking member rigidly secured between two annular retaining frames.

By the term thin annular braking member is meant an element or a plurality of elements having a total thickness not exceeding 0.10 inches. The braking element may be built up of interlaced metal wires, or perforated metal or plain sheet metal.

By reducing the thickness of the braking member of the disc, i. e., to a maximum of 0.10 inches, the contained heat is dissipated far more quickly, and thus the tendency of the disc to distort under the influence of heat is largely reduced; moreover, in the same axial space previously occupied by one conventional solid disc and associated friction pads it is possible to provide a plurality of thin discs and associated friction pads, thus giving an increased braking area and an increased surface for cooling by radiation and by the air. In addition, if the disc of the present invention is made air permeable so that cooling air may pass through it the cooling rate is increased and the tendency to distort is still further reduced. Another most important advantage lies in the fact that the brake disc of the present invention weighs but a fraction of the conventional solid disc.

In order to obtain the maximum advantage from the thin brake discs of the present invention, certain conditions should be met. For example, the friction pads should be of the "spot" type, i. e. covering only a small portion of the radial surface of the disc. A portion of the revolving disc, therefore, having left the area of the friction pad has time to cool before again being heated by said pad.

Again, to prevent distortion of the thin annular braking member it is necessary for the friction pads to be applied to both sides of the braking member with an approximately equal force, whilst it is obvious that the braking member must be of strong enough construction to withstand the stress imposed by the friction pads when the brakes are applied.

Fig. 1 is a face view of a brake disc embodying my invention;

Fig. 2 is a section of the brake disc taken on the line A—A of Fig. 1, and

Fig. 3 is a section similar to that of Fig. 2 of a part of the brake disc embodying another form of the invention.

In one embodiment of the invention (Fig. 1), a brake disc comprises a thin annulus 1 of beryllium-copper gauze, of approximately 0.02 inch thickness, secured between an outer annular retaining frame 2 and an inner-annular retaining frame 3. Driving dogs 4 are provided on the outer periphery of the outer frame to engage in complementary slots in an associated wheel, whereby the disc is caused to revolve when the wheel revolves.

The inner periphery of the outer frame and the outer periphery of the inner frame are each provided centrally with a radially extending annular slot, and the edges of the gauze annulus are compressed within said slots. As an additional measure to prevent relative rotation between the gauze annulus and one or both the retaining frames, the gauze annulus may be brazed or welded within the slots. This construction is illustrated in Fig. 2, which is a sectional elevation of Fig. 1 looking in the direction of the arrows.

The gauze annulus must be of sufficiently robust construction in order to effectively withstand the required braking stresses. For example, the braking member may consist of two annuli cut from a sheet of conventional type gauze, one placed over the other so that the wire strands of one annulus are disposed at an angle of 45° to those of the other annulus. Alternatively each individual wire of the gauze may be inclined at an angle of approximately 45° to the radius of the disc. Preferably the gauze is highly planished to present a smooth and plane surface to the friction pads associated with the non-rotatable portion of the wheel.

In another embodiment of the invention, illustrated in part sectional elevation in Fig. 3, the braking member extends from the inner periphery of the inner retaining frame to the outer periphery of the outer. To achieve this the inner frame, and the outer frame complete with driving dogs, are both divided circumferentially into two equal halves. The braking member 5 is cut from a plain metal sheet and its outer periphery is profiled to correspond with that of the outer retaining frame, i. e. including the driving dogs. The braking member is then sandwiched between the halves of the inner and outer frames and the whole is secured together by, for example, brazing or welding.

Where the braking member comprises one or more annuli of sheet metal, said annuli may conveniently be perforated or provided with narrow slots. The braking member may be made of any suitable metal, e. g., tungsten, nickel-chrome or beryllium copper. The retaining frames are preferably made of steel and the driving dogs may be provided on the inner periphery of the inner frame, instead of on the outer periphery of the outer frame, as described and illustrated.

Having described my invention what I claim is:

1. A brake disc which comprises an inner ring, an outer ring concentric with said inner ring, said rings each having a thickness greater than 0.1", a plane annular disc of metal having a thickness between 0.02" and 0.1" secured at its outer perimeter to said outer ring and at its inner perimeter to said inner ring, said annular disc comprising layers of wire gauze having the meshes of one layer at an angle to the meshes of an adjacent layer, one of said rings having projecting dogs for engagement with keyways of a wheel.

2. A brake disc which comprises an inner ring, an outer ring concentric with said inner ring and an annulus of interlaced wire mesh secured at its outer periphery to the inner periphery of the outer ring and secured at its inner periphery to the outer periphery of the inner ring and comprising layers of wire gauze having the meshes of one layer at an angle to the meshes of an adjacent layer.

3. The brake disc of claim 1 in which the exposed surfaces of said wire gauze are planished.

4. The brake disc of claim 2 wherein the exposed surfaces of said wire are planished.

References Cited in the file of this patent

UNITED STATES PATENTS

| Number | Name | Date |
|---|---|---|
| 488,539 | Claus | Dec. 27, 1892 |
| 1,249,826 | Putnam | Dec. 11, 1917 |
| 1,441,770 | Williams | Jan. 9, 1923 |
| 1,539,444 | Trainor | May 26, 1925 |

(Other references on following page)

UNITED STATES PATENTS

| Number | Name | Date |
|---|---|---|
| 1,585,624 | Heany | May 18, 1926 |
| 1,628,559 | Showers | May 10, 1927 |
| 1,670,320 | Thompson | May 22, 1928 |
| 1,971,665 | Tower | Aug. 28, 1934 |
| 2,105,867 | Stewart | Jan. 18, 1938 |
| 2,190,767 | Benson | Feb. 20, 1940 |
| 2,525,648 | Butler | Oct. 10, 1950 |

FOREIGN PATENTS

| Number | Country | Date |
|---|---|---|
| 276,854 | Great Britain | Sept. 8, 1927 |
| 272,968 | Italy | Mar. 26, 1930 |